US010310945B2

(12) United States Patent
Prabhu et al.

(10) Patent No.: US 10,310,945 B2
(45) Date of Patent: Jun. 4, 2019

(54) DATA MANAGEMENT OF UNIX FILE SYSTEMS

(71) Applicant: NETAPP, INC., Sunnyvale, CA (US)

(72) Inventors: Vasantha Prabhu, Bangalore (IN); Nikhil Kaplingat, Bangalore (IN); Girish Kumar, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 169 days.

(21) Appl. No.: 15/141,382

(22) Filed: Apr. 28, 2016

(65) Prior Publication Data

US 2017/0315872 A1  Nov. 2, 2017

(51) Int. Cl.
*G06F 17/00* (2019.01)
*G06F 11/14* (2006.01)
*G06F 16/11* (2019.01)

(52) U.S. Cl.
CPC ........ *G06F 11/1435* (2013.01); *G06F 16/122* (2019.01); *G06F 2201/80* (2013.01); *G06F 2201/805* (2013.01)

(58) Field of Classification Search
CPC ................. G06F 17/30; G06F 11/1435; G06F 17/30082; G06F 16/122
USPC .................................................. 707/600–899
See application file for complete search history.

(56) References Cited

U.S. PATENT DOCUMENTS

2008/0184125 A1\* 7/2008 Suleiman .................. G06F 3/06
715/734
2010/0293541 A1\* 11/2010 Pall .......................... G06F 8/61
717/178

\* cited by examiner

*Primary Examiner* — Isaac M Woo
(74) *Attorney, Agent, or Firm* — Klein, O'Neill & Singh, LLP

(57) ABSTRACT

Exemplary embodiments relate to techniques that allow for file system support to be rapidly deployed for new or updated operating system distributions. In some embodiments, a management component is provided perform data management on file systems. When a data management operation on a file system is requested, an operation component searches in a predetermined location for a named module that implements certain types of operations. The operation component then calls these operations (including validate, build and deport operations for the file system) to implement data management procedures in the file system. Implementing support for a new operating system or file system does not require that the management entity be rebuilt. Upon release of a new operating system or file system, a new named module can be written and placed in the predetermined location where the operation module is configured to search.

21 Claims, 13 Drawing Sheets

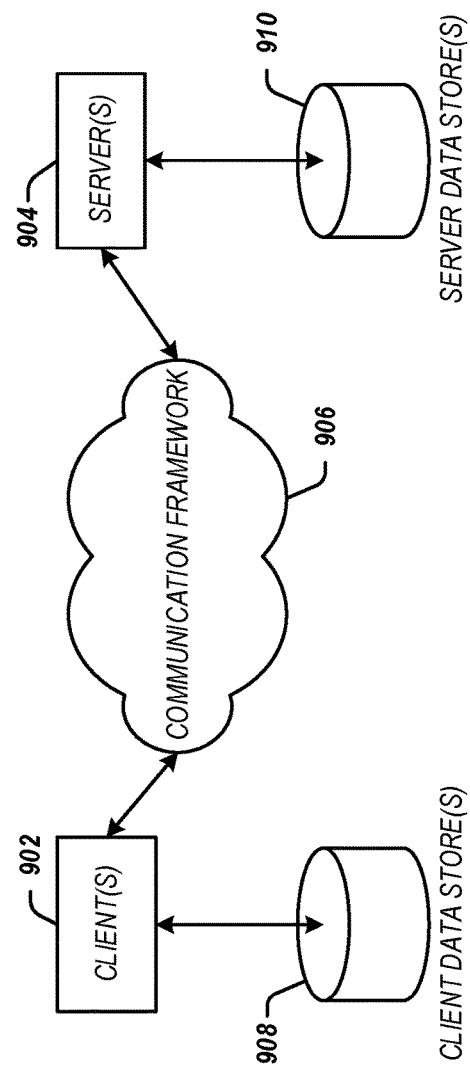

DATA MANAGEMENT OF UNIX FILE SYSTEMS

BACKGROUND

A computer's file system organizes data for storage and retrieval. Different types of operating systems provide different types of file systems. In some families of operating systems (e.g., the Windows® family of operating systems by Microsoft® of Redmond, Wash.), different versions of the operating system have a relatively uniform standard for file systems. In other families of operating systems, such as the various versions of operating systems based on the UNIX® operating system, different types of file systems may be used. For example, operating systems based on UNIX® may utilize the XFS® file system, the B-Tree File System (BTRFS), or the Extended File System (ext) family of file systems (e.g., ext3, ext4, etc.), among others.

This variation causes difficulty for entities that support operations on such file systems. For example, to provide data management capabilities when a new UNIX®-based distribution is released, a vendor may need to make changes to the code of their management software. This may necessitate that the software be completely rebuilt, an operation that can take an extended period of time (e.g., about six months). This rebuilding may need to be done each time a new distribution is released in order to provide up-to-date capabilities, which may require near-continuous updating of the management software.

BRIEF DESCRIPTION OF THE DRAWINGS

FIG. 9 depicts an exemplary network environment suitable for use with exemplary embodiments.

DETAILED DESCRIPTION

Figure 1A:
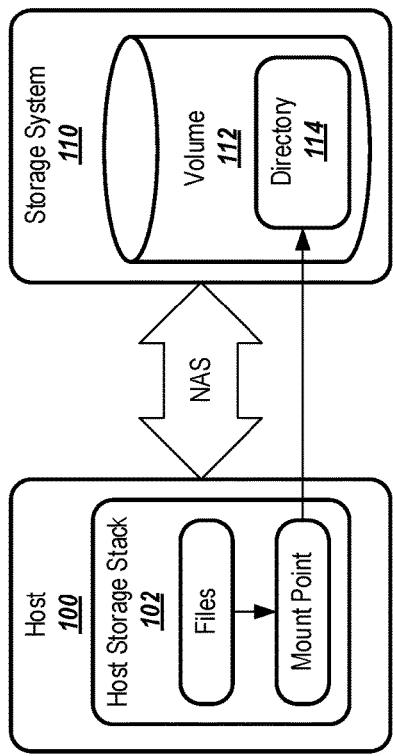
FIGS. 1A-1B depict examples of hosts interacting with various types of storage systems.

Exemplary embodiments relate to techniques that allow for file system support to be rapidly deployed for new or updated operating system distributions (and/or updates to the file system itself).

For instance, an entity may perform data management for a file system. One example of such a component is Snap-Drive® for Unix® (SDU) by NetApp®, Inc., of Sunnyvale, Calif. Within the management entity, an operation component may be provided. When management of data in a file system is requested, the operation component searches in a predetermined location for a named module that implements certain types of operations. The operation component then calls these operations to implement data management in the file system.

Although the operation component is a part of the management entity, implementing support for a new operating system or file system does not require that the management entity be rebuilt. Upon release of a new operating system or file system, a new named module can be written and placed in the predetermined location where the operation module is configured to search.

Accordingly, new types of file system support can be rapidly deployed by writing a new module for the operating system and placing the module in the appropriate location.

Exemplary embodiments provide a modular, script-based framework which allows newer operations/file systems/volume managers/multipath/hypervisor/operating systems to be dynamically added. Among other advantages, this may facilitate quicker support of newer flavors of UNIX stack currency. Exemplary embodiments provide flexible systems that may automatically discover multiple possible layouts of storage stacks on different types of hosts (e.g., employing different file system types, different communication protocols such as FC/iSCSI, different types of volume management such as LVM, systems utilizing a management pack versus systems not utilizing a management pack, etc.). Exemplary embodiments may execute a correct set of data management operations for these layouts in a single operation. Furthermore, by integrating with a centralized management component, exemplary embodiments may automatically discover the file systems on a remote host from a centralized place. This allows each layer of a storage stack to be discovered along with underlying storage, thereby detecting both supported and unsupported configurations at any layer. In this fashion, file systems that are candidates for management by the management component may be identified, and any file systems that are not candidates may be presented to a user or administrator (along with a reason as to why the file system is unsupported).

Exemplary embodiments are next described with reference to the attached drawings. Although exemplary embodiments may be described herein with respect to file systems for UNIX®-based operating systems, one of ordinary skill in the art will recognize that the techniques descried herein may be applied to any type of file system.

File Systems

FIG. 1A depicts an example of a host 100 that communicates with a storage system 110 according to a network attached storage (NAS) protocol. In this case, the host 100 organizes files according to a host storage stack 102 compatible with NAS, in which files are mapped to a mount point. The mount point corresponds to a particular director 114 in a particular volume 112 of the storage system 110.

Figure 1B:
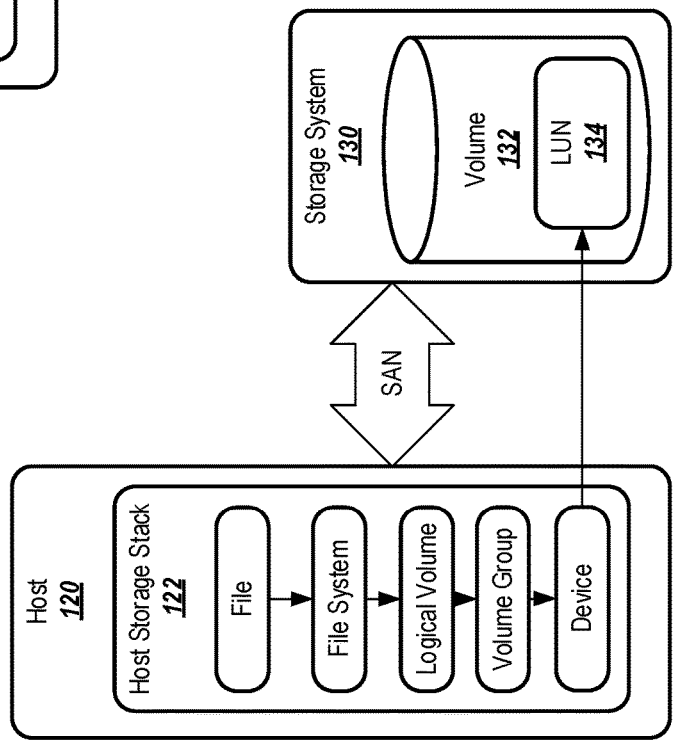

FIG. 1B depicts a second example of a host 120 communicating with a storage system 130 according to a Storage Area Network (SAN) protocol. In this case, the host 120 organizes files according to a host storage stack 122, in which files are mapped to a particular device within a volume group of a logical volume of a file system. The device maps to a logical unit number (LUN) 134 of a volume 132 in the storage system 130.

As shown in these two examples, different hosts and storage systems may organize files in different ways. According to exemplary embodiments discussed herein, a management component may perform data management operations on the storage systems 110, 130. The management component may perform actions such as discovering a topology of files in a file system, taking consistent backups of the file system, restoring files and associated file systems, and cloning file systems. In order to achieve this, the management component may possess an ability to easily navigate different types of host storage stacks 102, 122.

System Overview

Figure 2:
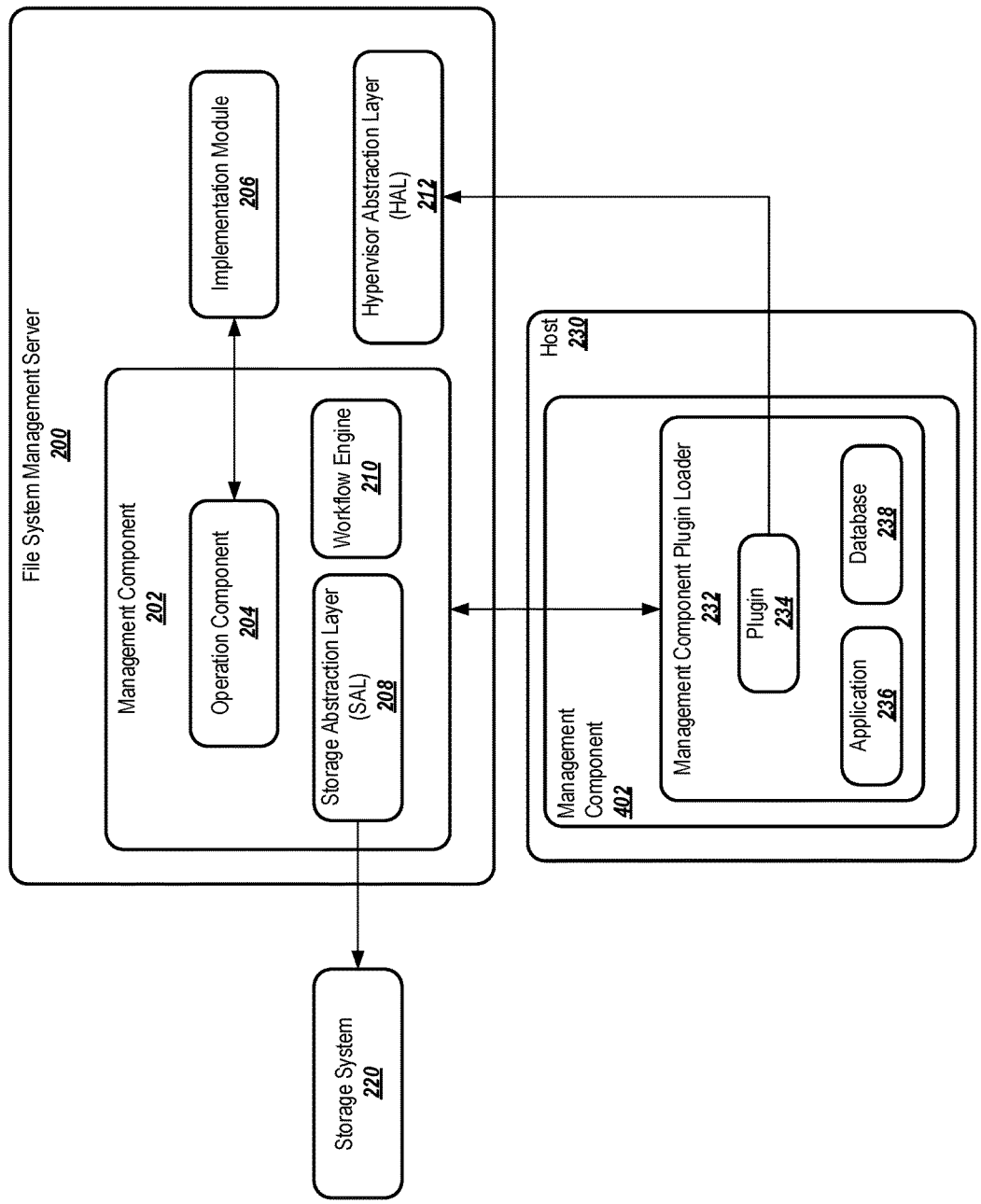
FIG. 2 depicts an overview of an exemplary system suitable for performing data management in different types of file systems.

FIG. 2 depicts an example of a system suitable for use with exemplary embodiments. A file system management server 200 serves as a point of contact between a host 230 and a storage system 220. It will be appreciated that the file system management server 200 may perform data management between multiple hosts 230 and storage systems 220.

A management component 202 of the file system management server 200 serves as a centralized application manager that includes a storage abstract layer (SAL) 208 for performing storage operations on the storage system 220 and a hypervisor abstraction layer (HAL) 212 for performing virtualization operations on a virtual machine hypervisor.

Figure 4:
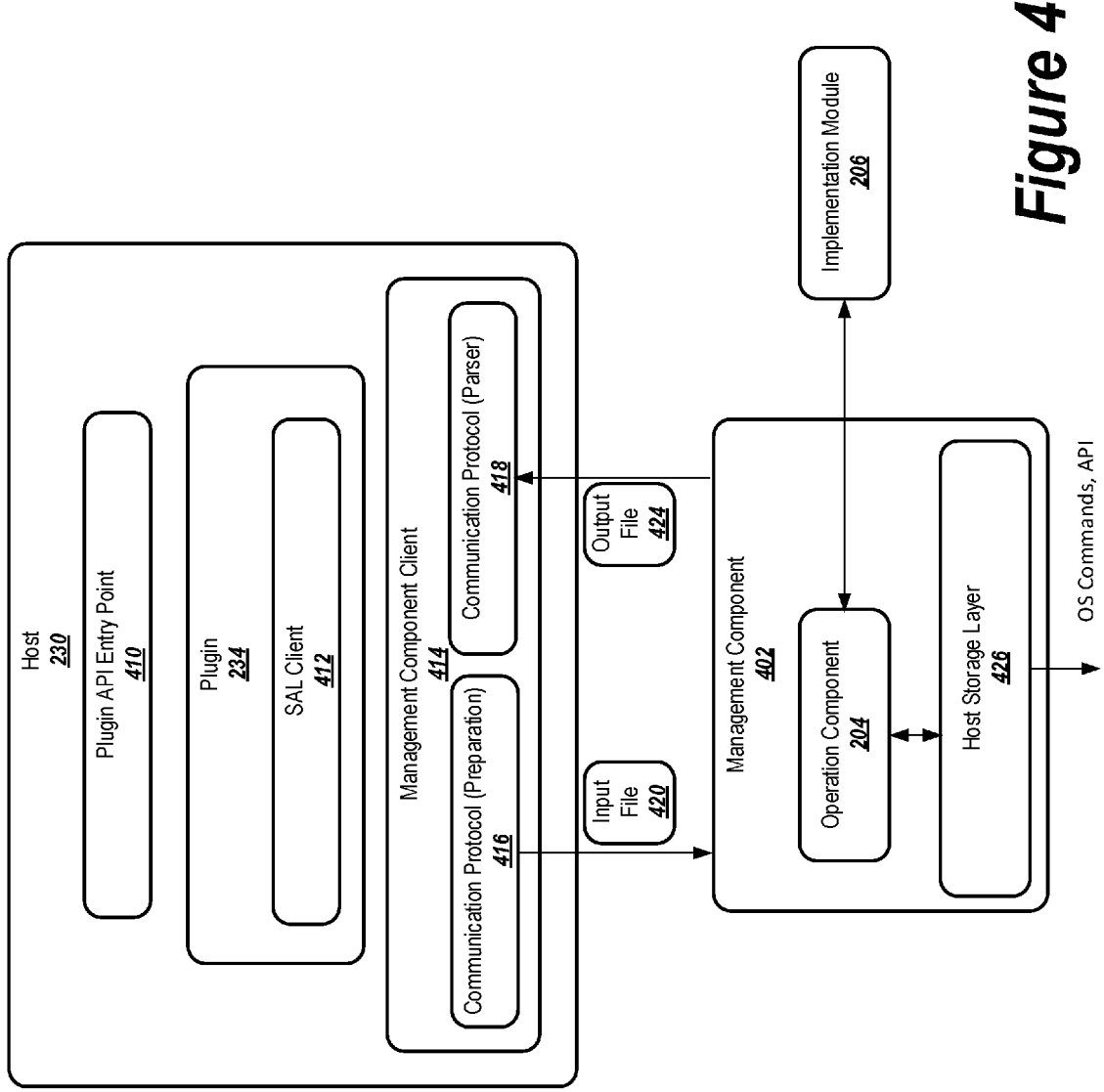
FIG. 4 depicts exemplary interactions between a host and a file system management server.

The host side also includes a host-side management component 402 that works in conjunction with the server-side management component 202 (shown in more detail in FIG. 4). According to exemplary embodiments, the host-side management component 402 may be implemented in a scripting language, such as Perl. An engine 210 may interact with the host 230 to backup, restore, and clone host-side entities (e.g., data).

Among other things, the host-side management component 402 (in combination with the plugin 234) is responsible for managing physical volumes, volume groups, logical volumes, and file systems. To accomplish this, the host-side management component 402 discovers on what type of storage a given file is residing, identifies a file-to-file-system topology, detects whether a file system is built on SAN- or NAS-based storage, and identifies export paths and junction paths for a NAS and LUN paths for a SAN.

Furthermore, the host-side management component 402 may maintain consistency of data and of a file system. To accomplish this, the management component may perform a file system quiesce (sync) operation before performing backup or snapshot operations. This serves to ensure that the synced backup/snapshot may be used to clone and restore the file system in order to revert the file system without loss of data.

The host-side management component 402 may also restore a cloned host stack when underlying storage represented by the host stack is cloned. Moreover, the host-side management component 402 may perform file system consistency checks.

A plugin 234 (e.g., a UNIX-based plugin) handles host-side complexities and communicates with the server-side management component 202. This plugin 234 may be deployed remotely from the file system management server 200 in each host 230. Among other things, the host 230 may support or provide resources for one or more applications 236 and/or databases 238, which may require access to data. The applications 236 and/or databases 238 may access the data stored on the storage system 220 through the plugin 234, which integrates with the server-side management component 202 through a management component plugin loader 232.

Optionally, a UNIX-based file system may reside on a virtualized entity (i.e., an entity in which data is managed based on virtual machine abstractions). The host-side management component 402 may also integrate with a virtualization plugin associated with the HAL 212 in order to support backup/restore/clone actions on file systems residing on virtualized entities.

According to exemplary embodiments, the host-side management component 402 may be application agnostic and may accept file(s) as an input for specifying activity parameters (e.g., parameters for a backup/restore). The files can belong to any application (such as Oracle, DB2, or could be user's data). SCU does translation of file to file system. There are various flavors of UNIX file systems (such as ext3, ext4, xfs, btrfs, nfs). In the case of SAN file systems, there are additional entities that need to be traversed, such as volume manager (Linux LVM). The volume manager can be built on multipathing stack. (Linux native multipathing).

In order to support data management activities on new or different types of file systems/operating systems, the host-side management component 402 may employ an operation component that consults an implementation module 206 for the file system/operating system type. When the host-side management component 402 receives a request to perform an activity or operation with respect to the storage system 220 and/or host 230, the operation component 204 may search in a predetermined location corresponding to the file system/operating system type for a file-system-specific or operating-system-specific implementation module 206. The implementation module 206 specifies canonical operations for each type of file system or operating system that can be employed in combination to carry out various data management activities. In order to support a new file system or operating system, a new implementation module 206 may be provided at a predetermined location corresponding to the file system or operating system. When data management requests are received for the new operating system, the operation component 204 simply consults the predetermined location, thereby obviating the need to completely rebuild the host-side management component 402 in order to support a new file system or operating system type.

Figure 3:
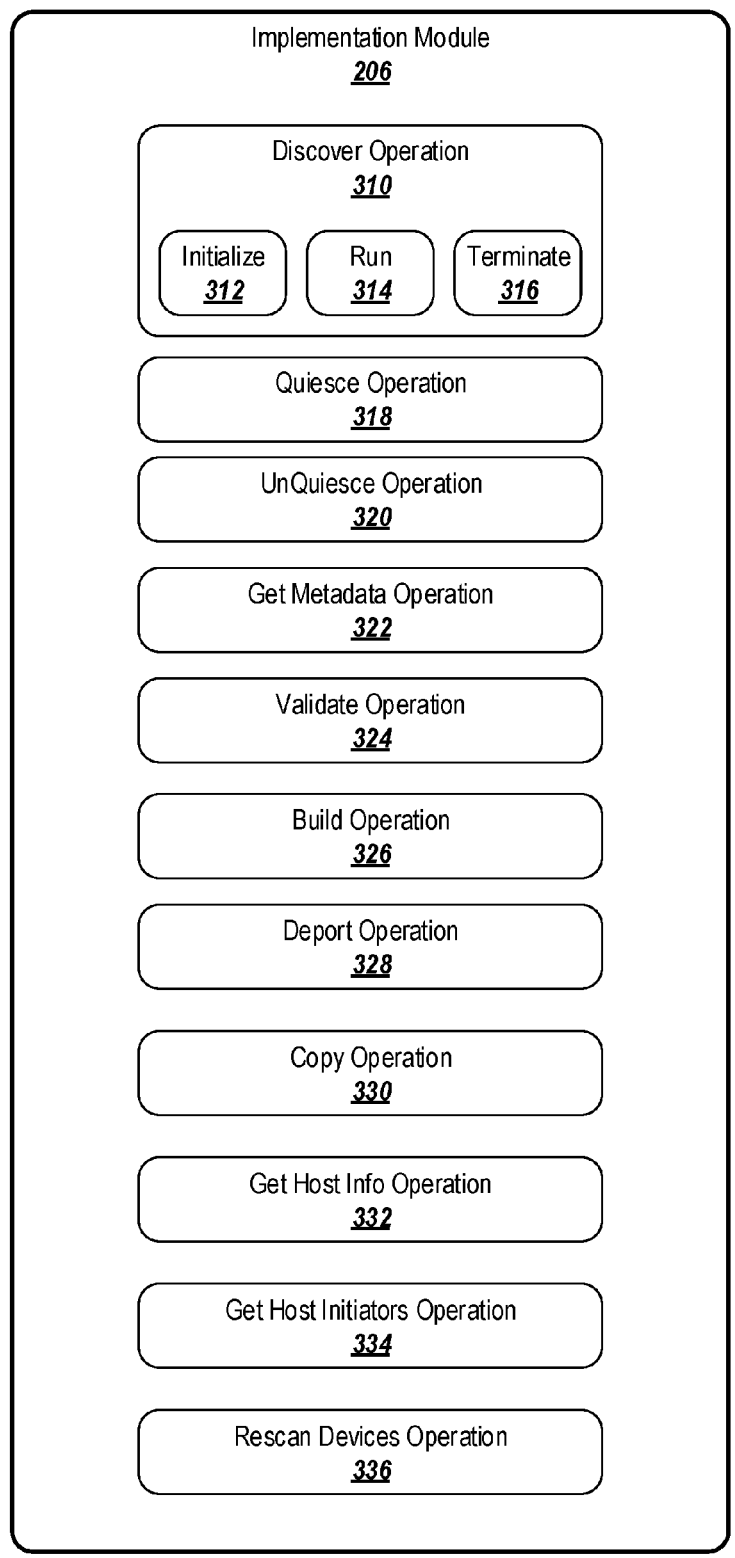
FIG. 3 depicts an exemplary implementation module suitable for use with exemplary embodiments.

An example of an operation module 206 is shown in more detail in FIG. 3.

Operations and the Operation Component

FIG. 3 depicts an exemplary operation module 206. The operation module 206 includes logic or instructions for carrying out different types of operations (e.g., a discover operation 310, a quiesce operation 318, etc.). The operations may be combined to perform various data management activities (e.g., backup, restore, clone, etc.). In some embodiments, the operations may be implemented as perl classes.

The operations may be stateless and may be transparent to the upper-level activity (e.g., backup/restore/clone) workflows. In other words, any plugin or application can combine these operations in different manners to implement an upper-level activity. The operations are agnostic as to the type of file system, type of multipathing stack, and type of operating system.

For example, a discover operation 310 identifies information about identified files, such as a list of file systems in which the file are stored, and storage information describing where the files are stored in the file systems. Exemplary pseudocode for implementing a discover operation 310 is provided below:

Discover Operation

1. Obtain the list of files from plugin 234 to be discovered.
2. Get all the file systems on the host and put into MountInfo hashMap. (MountInfo contains the file system mount point, type, options, storage entity etc.)
3. For each file
    a. Check for the file existence
    b. FileSystem containing the file is detected with the help of MountInfo hashMap c. Determine the file system type with the help of MountInfo hashMap
  i. If file system is of type NAS, return export path with the help of MountInfo
  ii. If file system is of type SAN
    1. If it is Logical volume
      a. Obtain handle to the LVM using HostStorage/LVM.pm
      b. Query all the PVs for the logical volume and add it to device list
    2. If it is on native device
      a. Add it to the device list
d. For each device
  1. Detect the type
  2. Load the device module handle based on the type using HostStorage/Device.pm
  3. Get LUN attributes from the device component.
4. Return discovered information.
  a. List of file systems
  b. For each file system it contains
    1. List of files belonging to a file system
    2. Storage information of a file system.

Another type of operation includes a quiesce operation 318. The quiesce operation 318 syncs a file system, for example in preparation for backup or cloning. Exemplary pseudocode for performing a quiesce operation 318 is provided below:

Quiesce Operation
  For each file system obtained in the input request:
    a. Detect the type of the file system
    b. Obtain the file system handle using HostStorage/FS.pm
    c. Perform Quiesce on the file system handle.
      a. (redirect to the actual file system's Quiesce implementation)

Other types of operations include an Unquiesce operation 320, a Get Metadata operation 322, a Validate operation 324 (for validating a host stack), a Build Operation 326 (for building a host stack), a Deport Operation 328 (for deporting a host stack), a Copy Operation 330, a Get Host Info Operation 332, a Get Host Initiators Operation 334, and a Rescan Devices Operation 336. Several of these operations will be familiar to one of ordinary skill in the art, and thus for the sake of brevity implementation details are omitted here. However, the validate operation 324 and the build operation 326 are specialized operations developed to support exemplary embodiments. Pseudocode for each of these operations is provided below.

Validate Operation
  ValidateHostStack Operation: This operation suggests a restore mechanism to be performed without incurring data loss.
  As part of VHS request, Metadata for file systems are also passed which was captured at the time of backup.
  VHS operation builds two views (data structure) for a given file system.
    a. Backup-View—File system information as per backup built from processing metadata
    b. Current-View—File system information currently on the host by discovering/querying the host.
  VHS assumes In-place to be default restore method since its faster, but any differences found, suggests Connect and Copy (CAC) restore
  Both the views are compared to detect the differences. The algorithm is as follows:
    a. First file system is checked for existence; if not In-Place restore method is suggested.
    b. All the new files that were added after the backup, All files that were part of backup and not part of restore, these files will be detected and reported as foreign files. VHS detects/reports first 20 foreign files in a breadth-first-search since the list can be too long. If there foreign files, CAC restore is suggested.
    c. File system types are checked, if there is a mismatch, CAC restore is suggested.
    d. If FS is of NAS, export path and data path are compared
    e. If FS is on SAN, device types are compared. SAN can be on Raw device, Multipath device or Logical volume built on volume group.
      1. If both are Raw/MP device, then LUN paths of the devices are compared
      2. If both are LV devices, Volume group names and UUID are compared.
      3. If both VG name are same, All the physical volumes and their respective lun paths are compared. Any mismatch in the number of LUN's or LUN paths, CAC is suggested.
    f. If FS is on LV, and there are other LV's sharing the same VG, CAC is suggested.
    g. If other File systems is as part of restore scope and share the VG, such file systems are detected, and in such a case, if any of the FS restore method is CAC, all FS belonging to the VG will have same restore method
    h. Recursive FS are also detected, and if any of the child FS is of CAC, parent FS restore method will also be overwritten with CAC.
  All the symbolic link files that were backed up, their links to targets are stored in metadata. VHS verifies that all links point to the same target and if not reports the difference and reports the difference.
  Based on the above comparisons, a restore method is calculated and returned.

Build Operation
  BuildHostStack operation: This operation builds a host stack, using UNIX-based kernel features. This operation is responsible for building the host side stack entities after the storage side entities are restored/cloned.
  FS type is read from metadata passed.
  a. If FS were of type NFS, data path, export path and mount options are read from metadata and mount is executed.
  b. There is no direct way in Linux to obtain the device given a LUN path. Hence the following steps are performed for SAN file system.
    a. All the devices are read from '/sys/block' and captured in internal data structure
    b. Lun paths are detected for all the devices via SCSI Inquiry
    c. Devices matching the LUN passed as part of request are taken.
  c. If FS were of Raw/Multipath/Raw-Partition/Multipath-partition
    a. Partition mappings are not created automatically when the LUN is mapped to host, so partition mappings are created if any, then the device is used for mounting
    b. If device was raw device, and at the time of restore it is under multipath, such heterogeneous scenarios are automatically handled
  d. If FS were mounted on a logical volume, a. All the physical volumes, volume groups and logical volumes are scanned.
b. In case of a clone, Cloned volume group name is generated, all the devices detected are physical volumes (PV), all PV's are imported to cloned volume group.
c. In case of In-place restore, Volume group name is same as at the time of backup which is present in metadata, once volume group is scanned, VG will be imported by LVM subsystem.
d. Volume group will be inactive state, which will be activated.
e. Appropriate LV devices are calculated and these LV devices are used for mounting.
e. FS name in case of restore is as passed in input, In case of clone/CAC restore, FS names are generated since it is a clone, and these FS directories are created and mounted.

When providing a new implementation module 206 for a new operating system or file system, each of the above-described operations may be implemented in the module. The operation component 204 may expect three procedures to be implemented for each operation: an initialize procedure 312, a run procedure 314, and a terminate procedure 316. The initialize procedure 312 initializes the operation, while the terminate procedure 316 de-initializes the operation. The run procedure 314 creates any host storage objects used by the operation, and calls methods on the objects in order to run the operation's logic.

The operations may be called by the host 230, as shown in FIG. 4. The host's plugin 234 implements the APIs used by the management component 202 to perform backup/restore/clone activities. The plugin 234 provides APIs to the management component 202 so that any application may perform file system management. To that end, the plugin 234 provides a plugin API entry point 410 callable by, for example, an application, in order to perform file system management activities. The plugin 234 acts like a client to the management component 202 and interacts via input files 420 and output files 424 (e.g., in the form of JSON files) to send a request and receive a response.

The plugin 234 includes a SAL client 412 for interacting with the SAL 208 of the management component 202. The SAL 208 represents the Storage Abstraction Layer, which interacts with the storage system 220 to perform various operations. Examples of operations performed by the SAL 208 include restoring files or LUNs from a snapshot, cloning volumes from a snapshot, mapping or unmapping a LUN to/from a host and deleting cloned volumes as Representational State Transfer (REST) services. The SAL 208 resides in the management server 200.

The SAL client 412. acts as a REST client to the SAL 208. This allows the system to utilize REST services for performing storage operations. Exemplary sequences of REST services use by the SAL client 412 and the SAL 208 are shown in FIG. 7B (connect-and-copy restore) and FIG. 7C (in-place restore).

The management component client 414 may include a communication protocol 416 for preparing and transmitting input files 420 (e.g., a JSON preparation module) and a communication protocol 418 for parsing output files 424 (e.g., a JSON parser).

At the host-side management component 402, the input file 420 is received and processed by the operation component 204 with the assistance of a host storage layer 426 that issues OS commands and API calls on behalf of the operation component 204.

More specifically, any subsystem (e.g. a UNIX subsystem) that acts on a storage entity falls under the category of host storage. The host storage layer 426 represents a collection of packages related to host storage entities, such as device entities, volume manager entities, operating system entities, and file system entities. Each package provides generic methods that abstracts out the operation carried out on the component and hides the complexity inside that package. The components may call native OS commands, or custom binaries encapsulating OS APIs. Each component includes a method to load a flavor of the component by name and return a handle to the caller.

The component related to the device entities provides APIs for operating on any kind of device. On UNIX, a device may be of type native, multipath, partition on native, partition on multipath, or logical volume.

The APIs provided by this component include APIs for:
1. Detecting the type of the device
2. Detect a major/minor number of the device
3. Getting LUN attributes of the device
4. Applying permissions on the device (via udev on linux)
5. Discovering all devices on a system.

The component related to volume managers provides APIs for operating on any kind of volume manager. Various flavors of volume managers include LinuxLVM, VxVM, etc. The APIs provided by this component include APIs for:
1. Obtaining physical volumes of a volume group
2. Obtaining logical volumes of a volume group
3. Obtaining information of a volume group such as number of PVs, number of LVs, UUID, etc volume manager attributes.
4. Discovering all volume groups on the system.

The component related to operating systems provides APIs for getting information from any OS flavor. Examples of OS flavors include Linux, AIX, Solaris etc. The APIs provided by this component include APIs for:
1. Mounting file systems
2. Obtaining information about file system persistence.
3. Getting an absolute path of a file The component relating to file systems provides APIs for the manageability of any type of FS. Various types of file systems include ext3, ext4, xfs, nfs, etc. The APIs provided by this component include APIs for performing the following operations:
1. Quiesce
2. UnQuiesce
3. Deport
4. Build
5. File system consistency A result of the operation(s) described above is packaged into the output file 424 and transmitted to the host 230.

Figure 5:
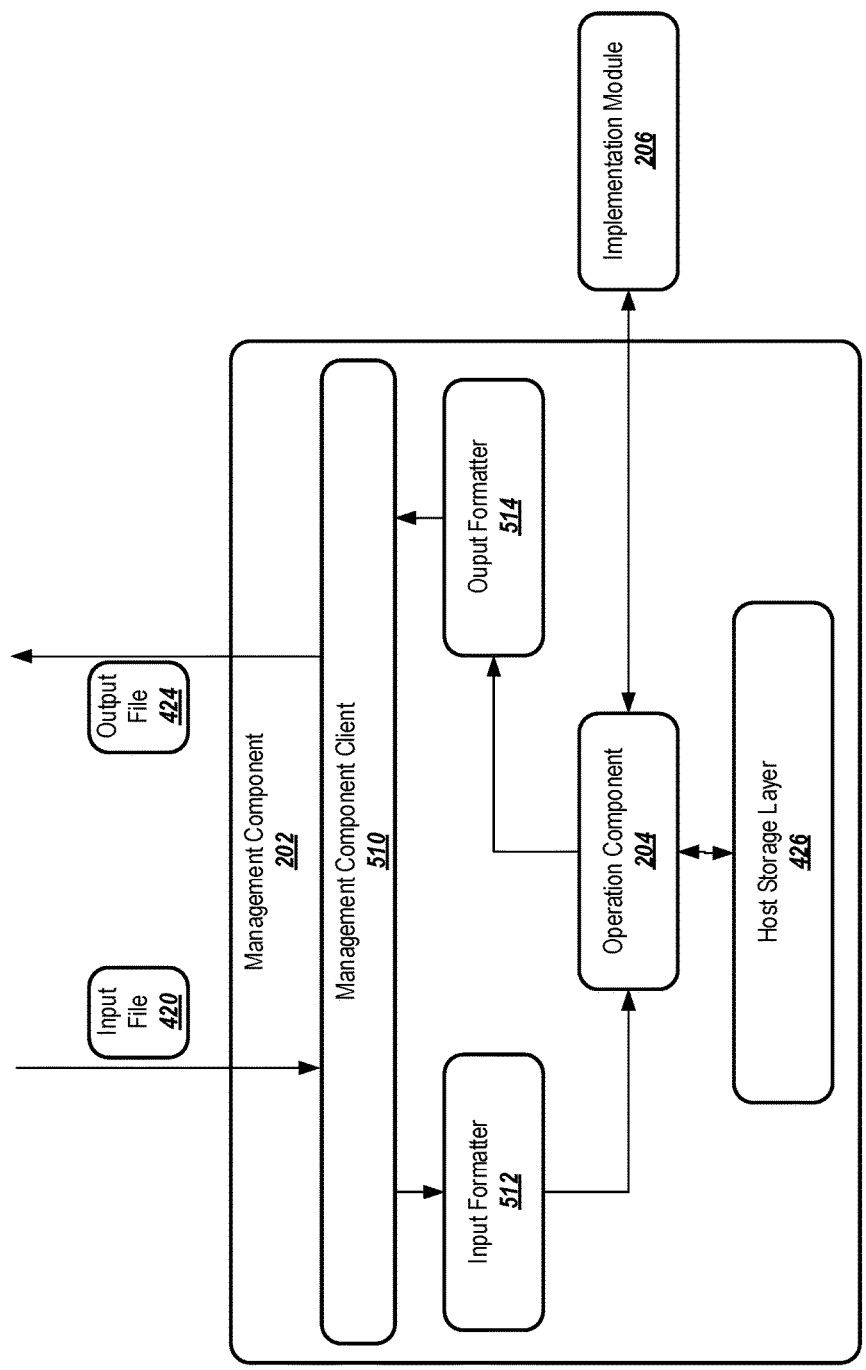
FIG. 5 depicts exemplary operations performed by a file system management server.

The various parts of the host-side management component 402 are shown in more detail in FIG. 5. The input file 420 is received by a management component client 510 that is in communication with the host 230. The management component client 510 provides the input of the input file 420 to an input formatter 512, which extracts the operations specified in the input file 420 and provides them to the operation component 204.

The operation component 204 is responsible the reading the operation name in the input file 420. The operation component 204 checks whether a corresponding class exists for the specified operation (e.g., in an appropriate implementation module 206), and instantiates the class by loading the implementation module 206 (or portion of the module 206) that matches the operation name in a predetermined directory. The operation component 204 returns the operation object, which may be identified in the output file 424. The operation component provides the operation object or the identity of the operation object to an output formatter, which generates the output file 424 and passes it to the management component client 510. The management component client 510 communicates with the host 230 through the parser 418.

If no appropriate implementation module 206 exists, the operation component 204 returns an error.

In order to add a new operation to the host-side management component 402, an implementation component 206 (e.g., a perl module) may be created having the name of the new operation. The component may implement the above-described initialize, run, and terminate methods for the operation. The resulting component may be placed in an operations directory of the host-side management component 402.

Exemplary Method

Figure 6:
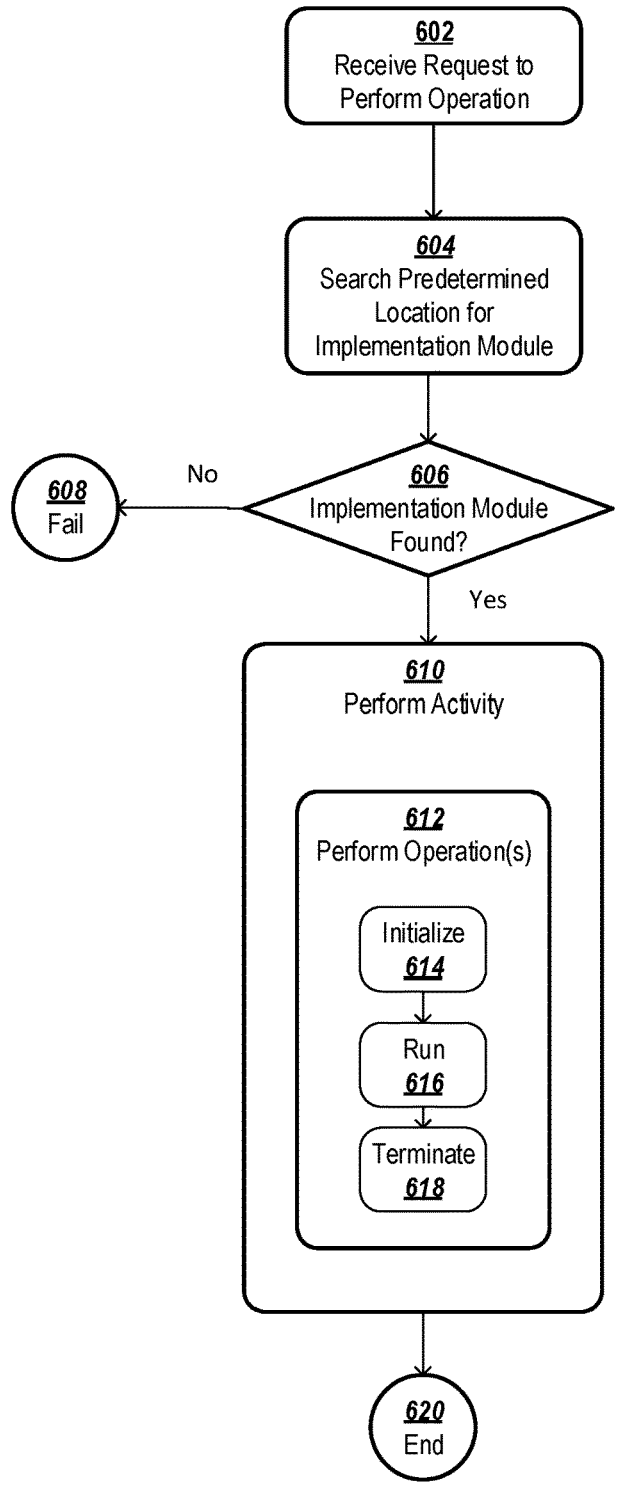
FIG. 6 depicts an exemplary method for data management in a file system.

FIG. 6 depicts exemplary operation logic 600 implementing a method for performing an operation with respect to a file system. In some embodiments, the operation logic 600 may be implemented as instructions stored on a non-transitory computer-readable medium.

At block 602, a system may receive a request to perform an operation. The operation may be a management operation performed with respect to a file system. For example, the request may be received by a communications interface of the file system management server 200 and presented to the management component 202. Among other possibilities, the operation may be a validate operation, a build operation, or a deport operation (as well as other types of operations previously described, for example in connection with FIG. 3). The request may specify, or may be otherwise associated with, a particular type of file system and/or operating system.

Alternatively or in addition, the system may receive a request to perform an activity at step 602. An activity represents an action performed with respect to the file system which is implemented by combining two or more of the operations in the implementation module 206. Examples of activities include backing up the file system, performing a connect-and-copy restore of the file system, performing an in-place restore of the file system, performing a clone-from-backup of the file system, or performing a deletion of a clone of the file system. The system may maintain a list of activities that can be implemented by combining operations, and each entry in the list may include a list of the operations (and the order of operations) to be performed. Because the operations are canonical, a single list of activities may be used to implement activities on a variety of different file systems/operating systems.

At block 604, the system may search in a predetermined location for an implementation module corresponding to the operation. The predetermined location may be, for example, a file or directory including the type of the file system (and/or the type of the operating system) on which the operation is requested to be performed. As previously described, the implementation module may include instructions for implementing particular aspects of the operation (e.g., an initialize subroutine, a run subroutine, and a terminate subroutine).

At block 606, the system may determine whether an implementation module was located at the predetermined location. If not, then at step 608 the system may report a failure back to the original requestor.

If the determination at block 606 is "yes" (i.e., an implementation module was found), then at blocks 610-612, the system may perform the requested activity and/or operation. If the original request was for an operation, then at block 612 the system may retrieve the operation's implementation from the implementation module and respectively run the operation's initialize (block 614), run (block 616), and terminate (block 618) subroutines. If the original request was for an activity, then at block 610 the system may retrieve the list of operations that implement the activity and may iteratively perform block 612 for each of the operations that implement the activity.

Examples of activities are discussed in more detail below with respect to FIGS. 7A-7E. In addition to operations implemented in the implementation module, other activities may be performed by the management component (including the storage abstraction layer, or SAL). In this example and the examples depicted in FIGS. 7A-7E, some of these activities are not expressly depicted or described, because they do not necessarily rely on file-system or operating-system specific procedures. For example, the management component may be capable of performing mapping or cloning operations in some circumstances without making file-system-specific calls. Thus, although FIGS. 7A-7E are labeled with a number of specific operations such as "build host stack" and "rescan devices," other steps may also be present which do not necessarily rely on operations implemented in the implementation module.

Once the activity and/or operation has been performed, processing may end at block 620.

Combining Operations to Support File System Activities

As noted above, complex activities may be implemented by combining operations in particular orders. FIGS. 7A-7E depict various activities and the operations that make up each activity.

Figure 7A:
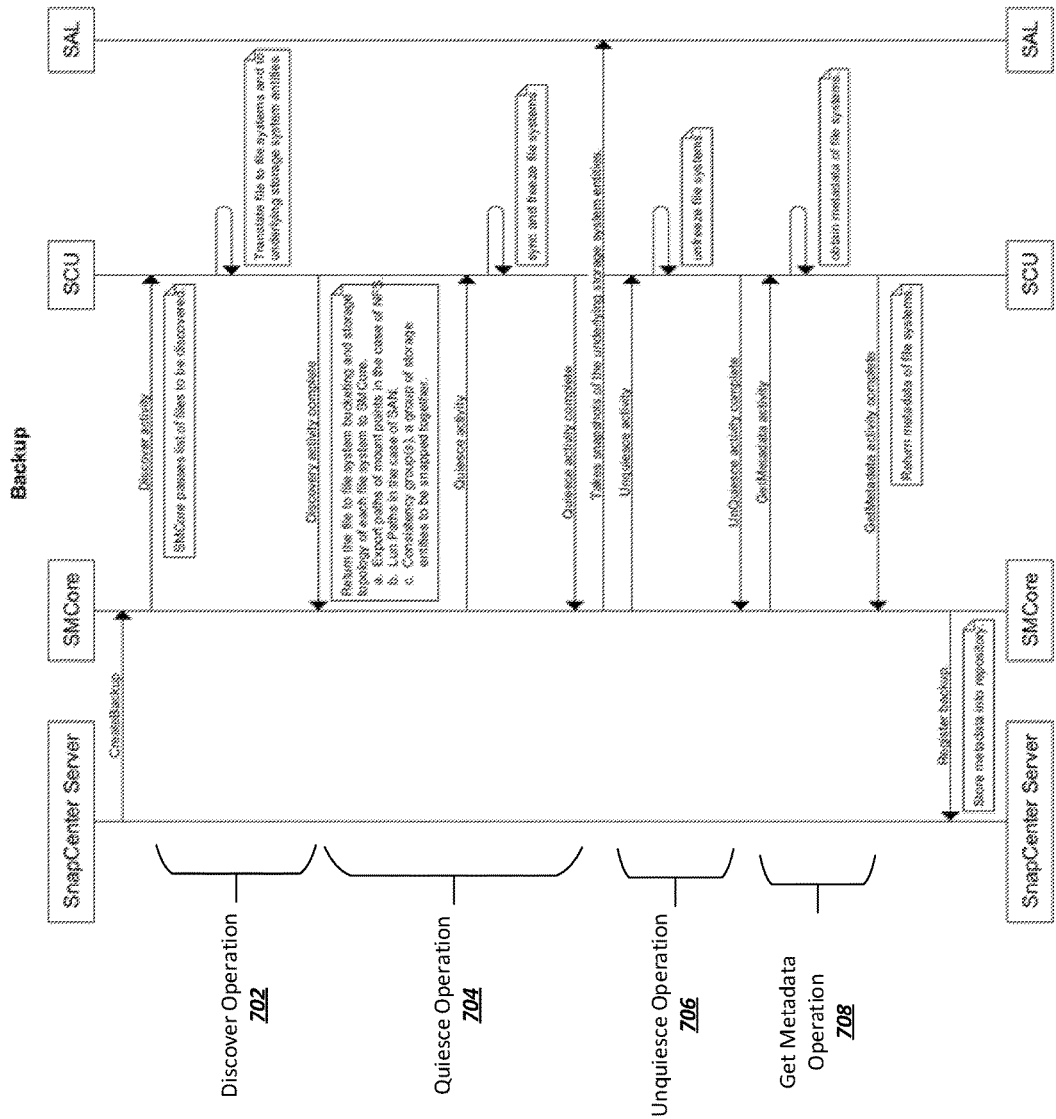
FIGS. 7A-7E depict exemplary file system activities performable by combining one or more of the operations depicted in FIGS. 5 and 6.
Figure 7B:
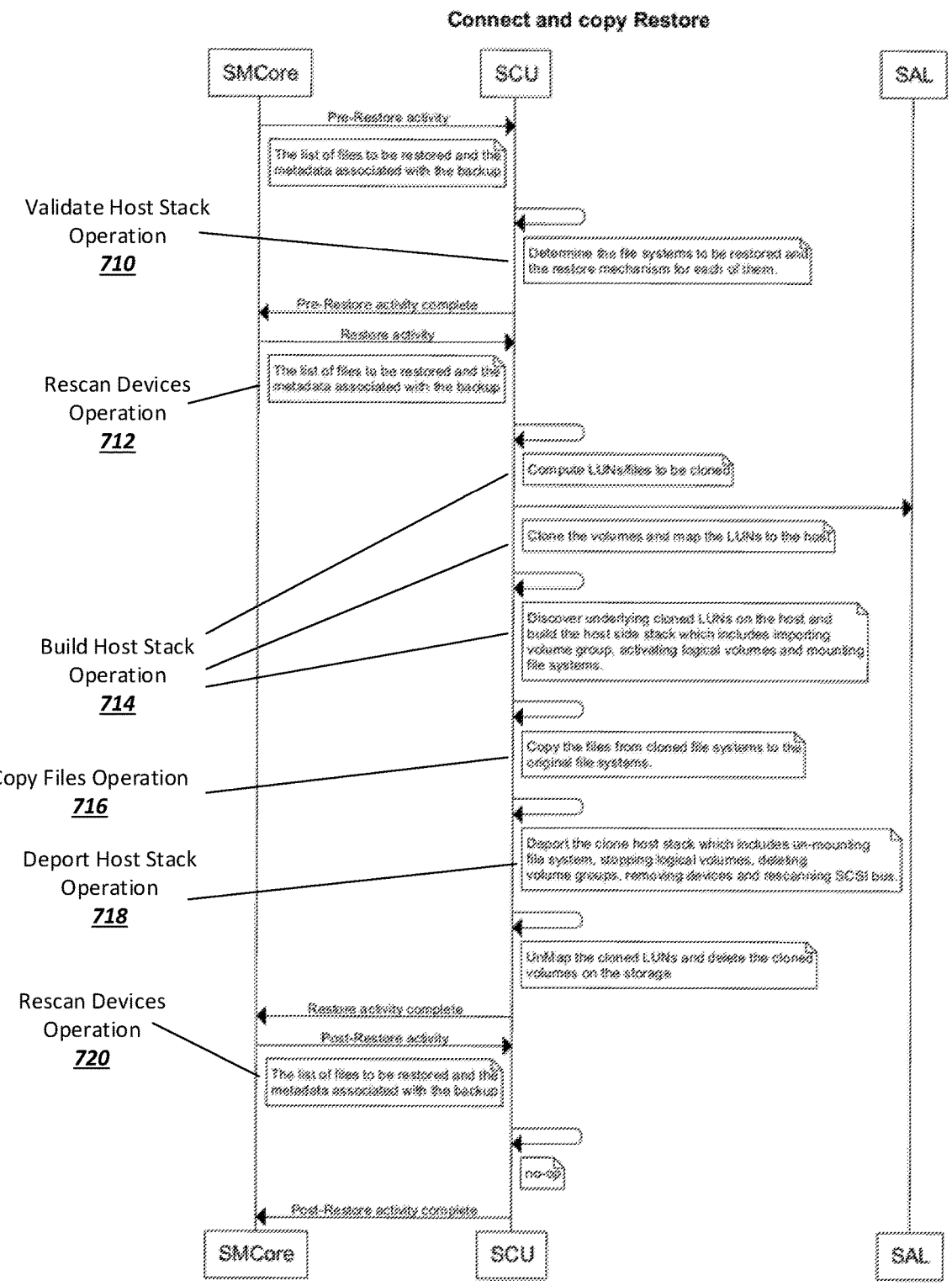

FIG. 7A depicts an example of a backup activity. The backup activity of FIG. 7A is implemented by performing a discover operation 702, a quiesce operation 704, an unquiesce operation 706, and a get metadata operation 708. Between the quiesce operation 704 and the unquiesce operation 706, the system may take a snapshot of the identified data. Exemplary pseudocode for implementing a backup activity is provided below:

1. Management Component passes list of files to be discovered.
2. Translate file to file systems and to underlying storage system entities.
3. Return the file to file system bucketing and storage topology of each file system to Management Component.
   a. Export paths of mount points in the case of NFS.
   b. Lun Paths in the case of SAN.
   c. Consistency group(s), a bunch of entities to be snapped together.
4. Sync and Freeze file systems.
5. SAL Takes snapshots of the underlying storage system entities.
6. Unfreeze (thaw) the file systems.
7. Obtain metadata of the file systems and return to Management Component for persisting the metadata information.

The system may similarly implement a restore from backup activity by having the management component 402 select a restore operation. Subsequently, the system may perform a Validate Host Stack operation 710, Rescan Devices Operation 712, Build Host Stack Operation 714, Copy Files Operation 716, Deport Host Stack Operation 718 (examples of which are shown in FIGS. 7B and 7C.)

Exemplary pseudocode for implementing a restore-from-backup activity is provided below:
1. User selects the backup and associated application entities to be restored in SMCore.
2. SCU obtains the list of files to be restored and the metadata associated with the backup.
3. Determine the file systems to be restored
4. Determine the restore mechanism for each file system using SCU core. (ValidateHostStack)
   i. If there is no change in current stack when compared to backup, In-Place restore is chosen.
   ii. If there is at least one change, then "connect and copy" restore is chosen.

FIG. 7B depicts an example of a connect-and-copy restore (as used in step 4.ii, above). A connect-and-copy restore activity may be implemented by performing a validate host stack operation 710, a rescan devices operation 712, a build host stack operation 714, a copy files operation 716, a deport host stack operation 718, and a rescan devices operation 720. Exemplary pseudocode for performing a connect-and-copy restore is provided below:
1. Compute the LUNs to be cloned from the file systems to be cloned
2. Clone and Map the underlying cloned LUNs to the host using SAL
3. Rescan HBA
4. Discover underlying cloned LUNs on the host and build the host side stack which includes importing disk group, starting host volumes and mounting file systems on the cloned LUNs.
5. Copy the files from cloned file systems to the original file systems.
6. Deactivate the clone host stack which includes unmounting file system, stopping host volumes and deporting disk groups, removing devices and rescanning SCSI bus.
7. UnMap the cloned LUNs and delete the cloned volumes on the storage using SAL.

Figure 7C:
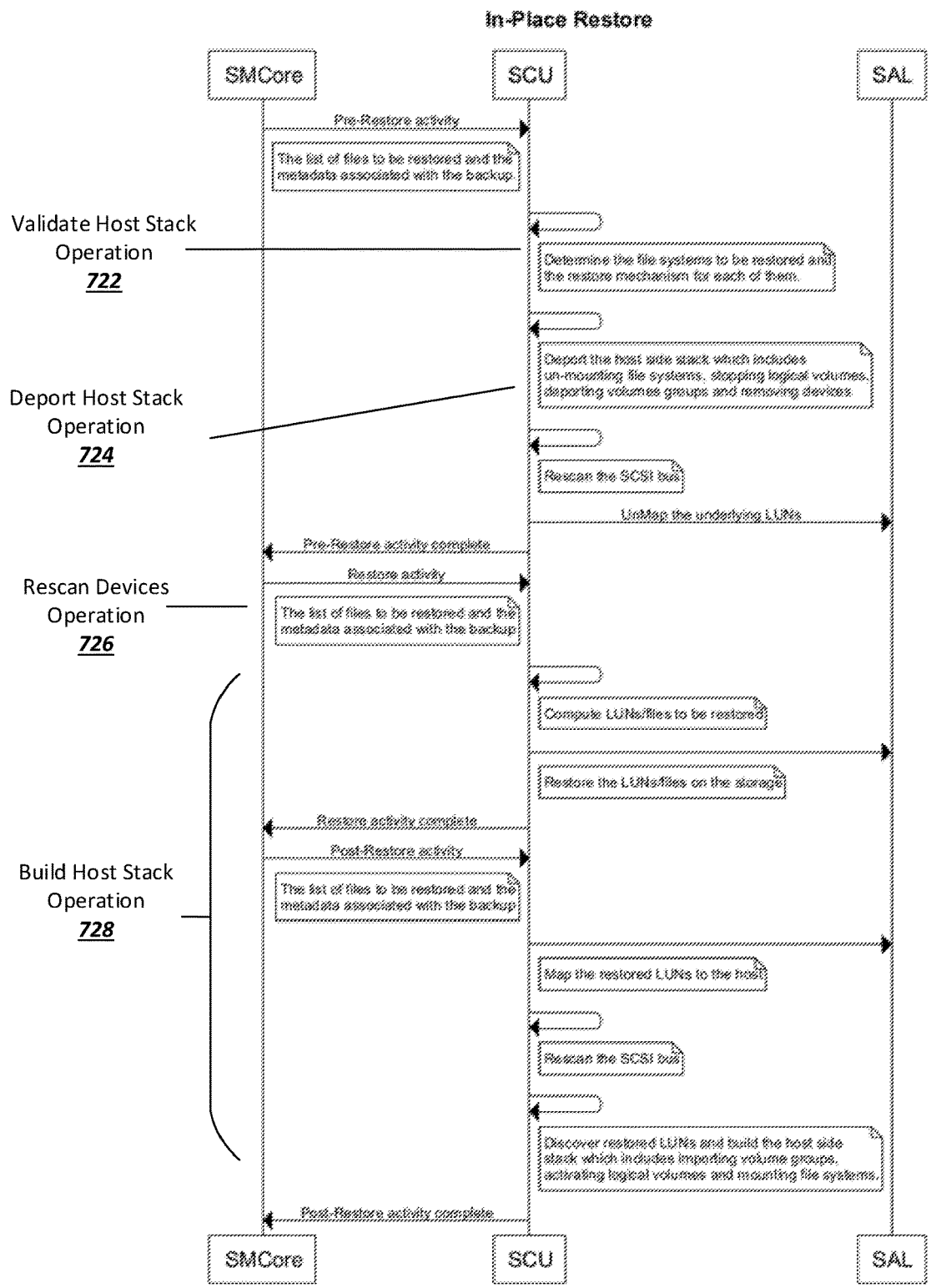

FIG. 7C depicts an example of an in-place restore (as used in step 4.i, above). An in-place restore activity may be implemented by performing a validate host stack operation 722, a deport host stack operation 724, a rescan devices operation 726, and a build host stack operation 728. Exemplary pseudocode for performing a connect-and-copy restore is provided below:
1. Translate the host side entities to underlying storage system entities.
2. Deactivate the host side stack which includes unmounting file system, stopping host volumes and deporting disk groups, removing devices and rescanning SCSI bus.
3. UnMap the underlying LUNs using SAL
4. Compute the LUNs to be restored
5. Restore the LUNs on the storage using SAL
6. Map the underlying LUNs to the host using SAL
7. Rescan HBA
8. Discover underlying LUNs on the host and activate the host side stack which includes importing disk group, starting host volumes and mounting file systems.

Figure 7D:
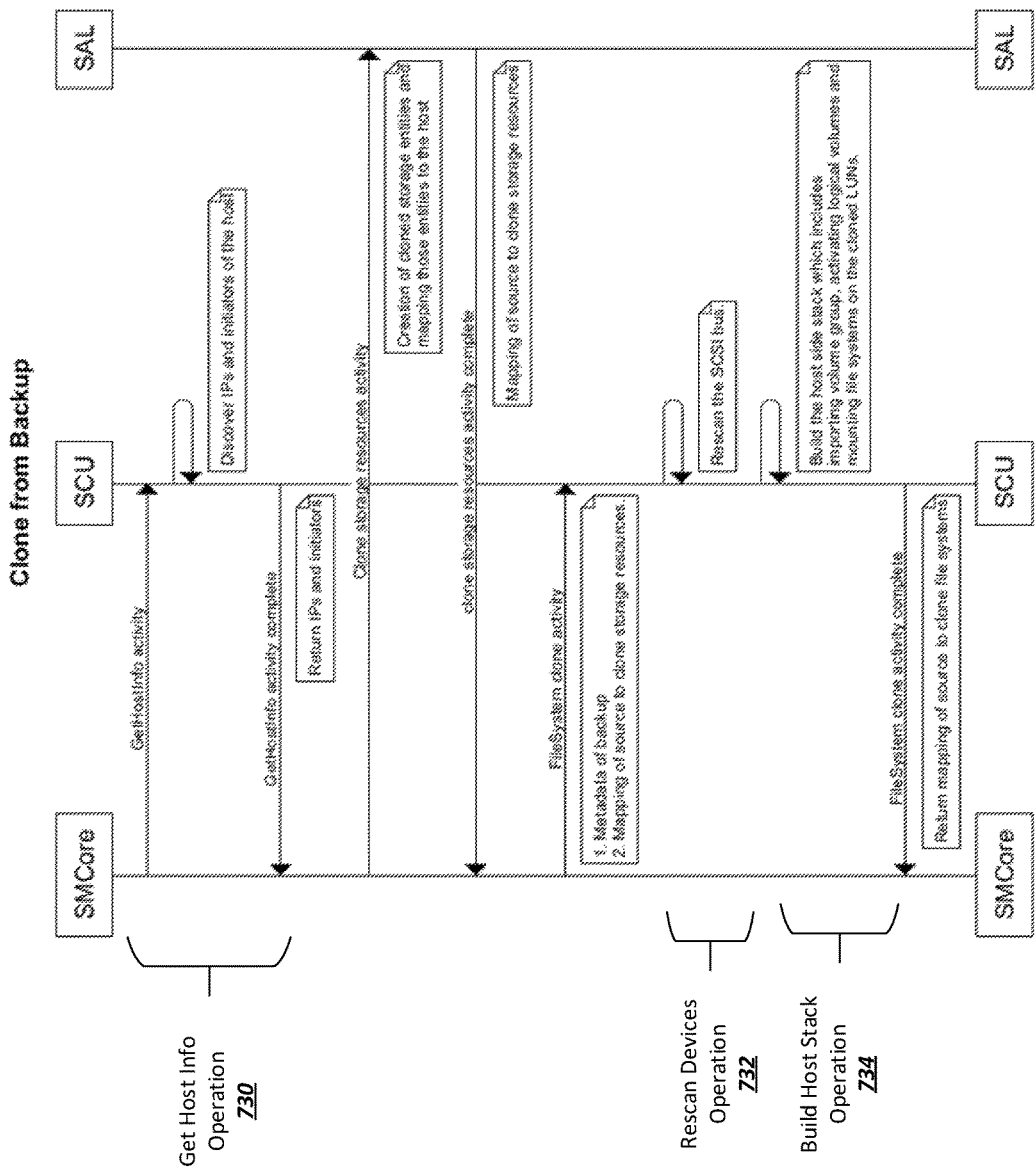

FIG. 7D depicts an example of a clone-from-backup activity. A clone-from-backup activity may be implemented by performing a get host info operation 730, a rescan devices operation 732, and a build host stack operation 734. Exemplary pseudocode for performing a clone-from-backup activity is provided below:
1. SMCore obtains the host details such as IP address/initiators through SCU.
2. Creation of cloned storage entities and mapping those entities to the host is done by SAL.
3. Obtains the metadata associated with the backup and the clone storage information from SMCore
4. Discover underlying cloned LUNs on the host (rescan HBA)
5. Build the host side stack which includes importing disk group, activating host volumes and mounting file systems on the cloned LUNs.
6. Returns mapping of source to clone file systems back to SMCore.

Figure 7E:
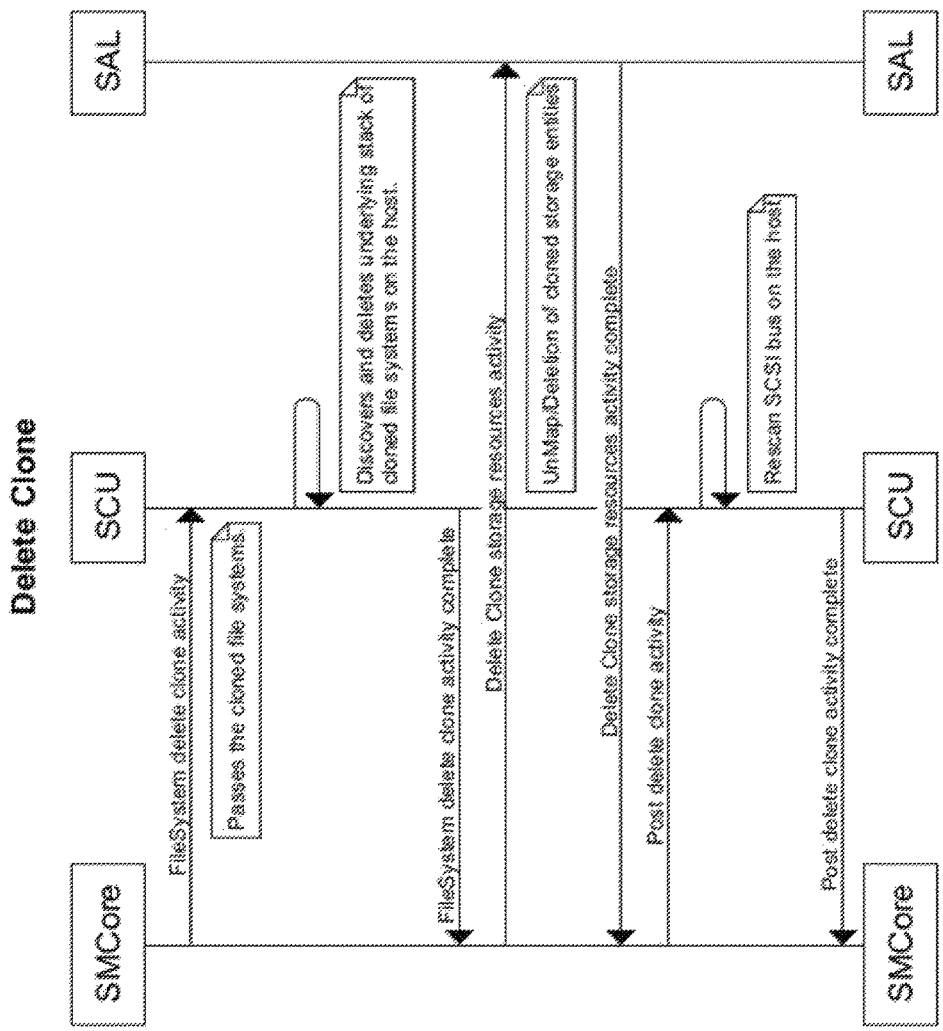
Figure 8:
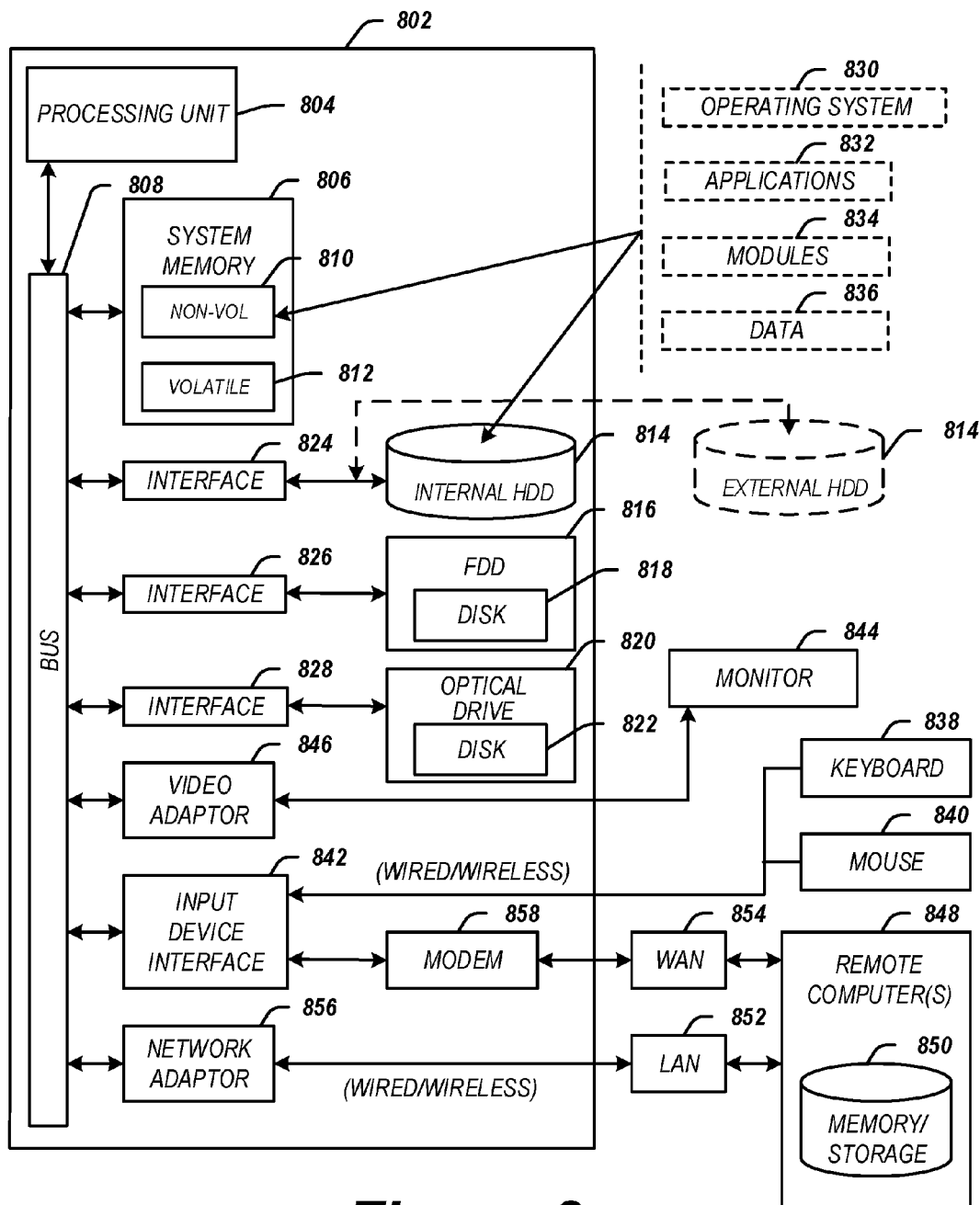
FIG. 8 depicts an exemplary computing device suitable for use with exemplary embodiments.

When the system is finished using a clone of a file system, the clone may be deleted using a procedure such as the one depicted in FIG. 7E Computer-Related Embodiments The above-described methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 694 interface technologies.

The drives may include traditional hard drives (HDDs) and/or flash-based drives. The drives may be all traditional HDDs, all flash drives, or a combination of HDDs and flash drives.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 30.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 842 that is coupled to the system bus 808, but can be connected by other interfaces such as a parallel port, IEEE 694 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 14 shown in FIG. 1. The servers 604 may implement the server device 104 shown in FIG. 1A. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
receiving by a processor a request for a file system implemented by an operating system of a computing device with access to data stored by a storage system; wherein the request is for a storage service associated with the data;
retrieving by the processor, instructions from a predetermined location corresponding to a file system type that varies based on a protocol used by the computing device to communicate with the storage system and an operating system type to execute an operation for the request; wherein predetermined locations store a plurality of instructions corresponding to file system and operating system types for executing storage service related operations; and
executing the operation based on the retrieved instructions using a plugin interfacing with the storage system for a storage related function and an application plugin interfacing with an application that accesses the data;
wherein when the operation is a validate operation a restore type operation is selected based on the file system type; wherein a first restore type operation is selected when a current state of the file system and a backup state of the file system are the same and a second restore type operation is selected when the current state and the backup state are different.

2. The method of claim 1, wherein the operating system is a UNIX®-based operating system.

3. The method of claim 1, wherein when the operation is a build operation, then the instructions are used to generate a host side stack after a storage data unit has been restored using the plugin for the storage system.

4. The method of claim 1, wherein the restore type operation is selected from one of a connect-and-copy restore of the file system, and an in-place restore of the file system.

5. The method of claim 1, wherein the operation implements an initialization procedure, a run procedure, and a terminate procedure.

6. The method of claim 1, wherein for a new type of operating system, new instructions are stored specific to the new operating system type at a predetermined location without rebuilding a management component that performs the operation.

7. The method of claim 1, wherein a management device executes the plugin for interfacing with the storage system and manages the application plugin of the computing device.

8. A non-transitory machine-readable storage medium having stored thereon instructions for performing a method, comprising machine executable code which when executed by at least one machine, causes the machine to:
receive a request for a file system implemented by an operating system of a computing device with access to data stored by a storage system; wherein the request is for a storage service associated with the data;
retrieve instructions from a predetermined location corresponding to a file system type that varies based on a protocol used by the computing device to communicate with the storage system and an operating system type to execute an operation for the request; wherein predetermined locations store a plurality of instructions corresponding to file system and operating system types for executing storage service related operations; and
execute the operation based on the retrieved instructions using a plugin interfacing with the storage system for a storage related function and an application plugin interfacing with an application that accesses the data;
wherein when the operation is a validate operation a restore type operation is selected based on the file system type; wherein a first restore type operation is selected when a current state of the file system and a backup state of the file system are the same and a second restore type operation is selected when the current state and the backup state are different.

9. The non-transitory storage medium of claim 8, wherein when the operation is a build operation, then the instructions are used to generate a host side stack after a storage data unit has been restored using the plugin for the storage system.

10. The non-transitory storage medium of claim 8, wherein the restore type operation is selected from one of a connect-and-copy restore of the file system, and an in-place restore of the file system.

11. The non-transitory storage medium of claim 8, wherein the operation implements an initialization procedure, a run procedure, and a terminate procedure.

12. The non-transitory storage medium of claim 8, wherein for a new type of operating system, new instructions are stored specific to the new operating system type at a predetermined location without rebuilding a management component that performs the operation.

13. The non-transitory storage medium of claim 8, wherein a management device executes the plugin for interfacing with the storage system and manages the application plugin of the computing device.

14. The non-transitory storage medium of claim 8, wherein the operating system is a UNIX®-based operating system.

15. A system comprising:
a memory containing machine readable medium comprising machine executable code having stored thereon instructions; and a processor module coupled to the memory, the processor module configured to execute the machine executable code to:
receive a request for a file system implemented by an operating system of a computing device with access to data stored by a storage system; wherein the request is for a storage service associated with the data;
retrieve instructions from a predetermined location corresponding to a file system type that varies based on a protocol used by the computing device to communicate with the storage system and an operating system type to execute an operation for the request; wherein predetermined locations store a plurality of instructions corresponding to file system and operating system types for executing storage service related operations; and
execute the operation based on the retrieved instructions using a plugin interfacing with the storage system for a storage related function and an application plugin interfacing with an application that accesses the data;
wherein when the operation is a validate operation a restore type operation is selected based on the file system type; wherein a first restore type operation is selected when a current state of the file system and a backup state of the file system are the same and a second restore type operation is selected when the current state and the backup state are different.

16. The system of claim 15, wherein when the operation is a build operation, then the instructions are used to generate a host side stack after a storage data unit has been restored using the plugin for the storage system.

17. The system of claim 15, wherein the restore type operation is selected from one of a connect-and-copy restore of the file system, and an in-place restore of the file system.

18. The system of claim 15, wherein the operation implements an initialization procedure, a run procedure, and a terminate procedure.

19. The system of claim 15, wherein for a new type of operating system, new instructions are stored specific to the new operating system type at a predetermined location without rebuilding a management component that performs the operation.

20. The system of claim 15, wherein a management device executes the plugin for interfacing with the storage system and manages the application plugin of the computing device.

21. The system of claim 15, wherein the operating system is a UNIX®-based operating system.

* * * * *